US006266295B1

(12) United States Patent
Parker et al.

(10) Patent No.: US 6,266,295 B1
(45) Date of Patent: Jul. 24, 2001

(54) SYSTEM AND METHOD OF DISPLAYING TIMES CORRESPONDING TO EVENTS ON A CALENDAR

(75) Inventors: Kathryn L. Parker, Fall City; Michael McDevitt, North Bend; Greg Keyser, Kirkland; Scott A. Skorupa, Newcastle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/053,335

(22) Filed: Apr. 1, 1998

Related U.S. Application Data

(60) Provisional application No. 60/088,360, filed on Jan. 7, 1998.

(51) Int. Cl.[7] .................................................. G04B 19/24
(52) U.S. Cl. ................................................ 368/28; 368/41
(58) Field of Search ...................... 368/28, 30, 41

(56) References Cited

U.S. PATENT DOCUMENTS

| | | | |
|---|---|---|---|
| 4,645,238 | 2/1987 | Vincent et al. ........................ | 283/67 |
| 5,271,172 | * 12/1993 | Ureta ..................................... | 40/107 |
| 5,412,886 | * 5/1995 | Quinn .................................... | 40/119 |
| 5,500,938 | 3/1996 | Cahill et al. .......................... | 395/161 |

FOREIGN PATENT DOCUMENTS 0 740 255 A1   10/1996   (EP) .

OTHER PUBLICATIONS

"Graphical Indicator For Calendar Days That Have Out–Of–Sync Data", *IBM Technical Disclosure Bulletin*, vol. 35, No. 6, Nov. 1992,pp. 375–377, New York, U.S.A.

\* cited by examiner

*Primary Examiner*—Bernard Roskoski
(74) *Attorney, Agent, or Firm*—Joesph P. Kelly; Westman, Champlin & Kelly, P.A.

(57) ABSTRACT

A system and method provide an event display. The event display includes a visual indication of a day on which the event occurs. The event display also includes an analog clock face representation having a contrasting portion indicating a time of the event.

38 Claims, 10 Drawing Sheets

SYSTEM AND METHOD OF DISPLAYING TIMES CORRESPONDING TO EVENTS ON A CALENDAR

The present application makes reference to, and claims priority from U.S. Provisional Patent Application Ser. No. 60/088,360 filed on Jan. 7, 1998.

BACKGROUND OF THE INVENTION

Mobile devices are small electronic computing devices often referred to as personal digital assistants. Many of such mobile devices are hand-held devices, or palm-sized devices which comfortably fit within the hand. One commercially available mobile device is sold under the trade name Handheld PC (or H/PC) having software provided by Microsoft Corporation of Redmond, Wash.

Mobile devices can perform a wide variety of computing tasks and execute a wide variety of applications. Personal information managers (PIMs) are particularly well suited to mobile devices.

PIMs typically comprise applications which enable the user of the mobile device to better manage scheduling and communication, and other such tasks. Some commonly available PIMs include scheduling and calendar programs and are included in the commercially available under the brand names Microsoft Schedule+and Microsoft Outlook, both of which are provided by Microsoft Corporation of Redmond, Wash.

The small physical size of such mobile devices can present significant obstacles in attempting to implement such PIMs. For example, conveying information through the electronic display can be difficult under certain circumstances. Many users of PIMs, when viewing a schedule, wish to have more than one day viewable at once. In fact, some users may wish to have an entire month, several months, or an entire year, viewable at once. However, the electronic display in such mobile devices is typically much smaller than that found on a conventional desktop computer. For example, mobile devices may have a display formatted as a grid having a size of only 240×320 pixels. Some such mobile devices, in fact, have a display which is as small as 160×160 pixels. This is much smaller than a conventional desktop computer screen. Consequently, the resolution can be much lower as well. In small screen devices, it becomes more difficult to show useful information at a single glance. For instance, it is typically not difficult to provide a calendar view showing the events of a single day since the entire screen can be used to display that day's events. However, if multiple days are to be shown at once, the space available to display each day's events in a meaningful way is considerably limited. The problem becomes even more significant when trying to show, for instance, events for an entire month at a glance.

Several attempts have been made to provide a view of multiple days (such as a month view) and still give an indication as to the number of appointments or events scheduled for each day in that month. One such prior art mobile device has provided a month view which shows a conventional calendar face, having a square representing each day in the month. Each square has a pair of blocks, one at the top of the square and one at the bottom of the square, which can be shaded. If the user of the mobile device has one or more appointments before noon on any given day, then the top block in the corresponding square is shaded. If the user has one or more appointments or events scheduled in the afternoon of a specific day, then the bottom block in the corresponding square is shaded. If the user has appointments or events scheduled both before and after noon of any given day, then both blocks are shaded. Of course, this type of system does not convey how busy a person is for any given day, nor does it give any indication as to whether certain times in the morning or afternoon are free of appointments or events, unless the entire morning or afternoon is free.

In another prior art device, three blocks are provided. Two of the blocks are similar to those described above, while the third represents a time period from 12:00 noon to 1:00 PM.

SUMMARY OF THE INVENTION

A system and method provide an event display. The event display includes a visual indication of a day on which the event occurs. The event display also includes clock face representation having a user observable portion indicating a time of the event.

DETAILED DESCRIPTION OF THE PREFERRED EMBODIMENTS

Figure 1:
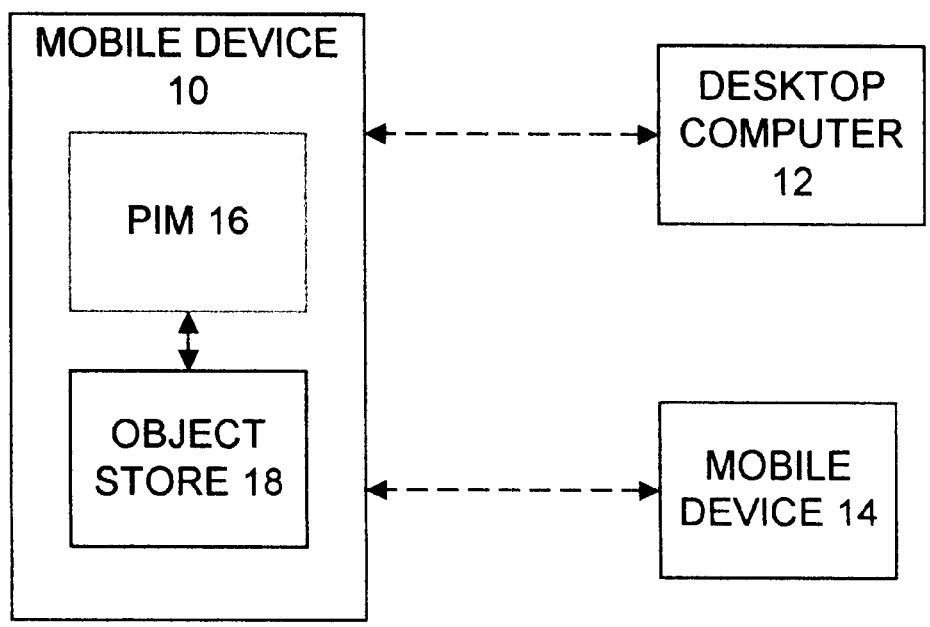
FIG. 1 is a simplified block diagram illustrating one embodiment of a mobile device in accordance with the present invention.

FIG. 1 is a block diagram of mobile device 10 in accordance with the present invention. FIG. 1 illustrates that, in one preferred embodiment, mobile device 10 is suitable for connection with a desktop computer 12, another mobile device 14, or both. However, it should also be noted that mobile device 10 may not be equipped to be connected to desktop computer 12 or another mobile device 14, and the present invention applies regardless of whether mobile device 10 is provided with this capability.

In any case, mobile device 10 preferably includes an application program (such as a personal information manager (PIM)) 16 and an object store 18. Object store 18 is preferably configured to store a plurality of individual records or objects, each comprising a plurality of fields or properties related to features of PIM 16. For example, where PIM 16 is a scheduling program, object store 18 is configured to store objects, each of which has a plurality of properties which can be associated with scheduling or calendaring features provided by PIM 16.

PIM 16 is configured to maintain objects in object store 18. For instance, when the user enters an appointment or schedules an event on mobile device 10, PIM 16 is configured to receive the user input information and create an object associated with the scheduled event. The object is maintained in object store 18 for later use by PIM 16, such as for later displaying the event to the user in the form of a calendar display.

It is also worth noting that, in the preferred embodiment, mobile device 10 can be coupled to desktop computer 12 or another mobile device 14. This connection can be made using any suitable, and commercially available, communication link and using a suitable communications protocol. For instance, in one preferred embodiment, mobile device 10 communicates with either desktop computer 12 or another mobile device 14 with a physical cable which communicates using a serial communications protocol. Other communication mechanisms are also contemplated by the present invention, such as infrared (IR) communication, dial up modem communication, wireless modem communication, wireless cellular digital packet data (CDPD), or other suitable communication mechanisms.

Further, mobile device 10, in the preferred embodiment, can be synchronized with either desktop computer 12, or another mobile device 14, or both. In that instance, properties of objects stored in object store 18 are similar to properties of other instances of the same objects stored in an object store on desktop computer 12 or mobile device 14. Thus, for example, when a user changes one instance of an object stored in the object store on desktop computer 12, the second instance of that object in object store 18 of mobile device 10 is updated the next time mobile device 10 is connected to desktop computer 12 so that both instances of the same object contain up-to-date data. This is referred to as synchronization. Specifically, for instance, if the user enters an appointment or meeting or other event on a PIM or desktop computer 12, the appointment can be synchronized to mobile device 10 the next time mobile device 10 is coupled to desktop computer 12. Similar synchronization can be accomplished from mobile device 10 to desktop computer 12 as well.

In order to accomplish synchronization, synchronization components run on both mobile device 10 and desktop computer 12 (or mobile device 14). The synchronization components communicate with one another through well defined interfaces to manage communication and synchronization.

Figure 2:
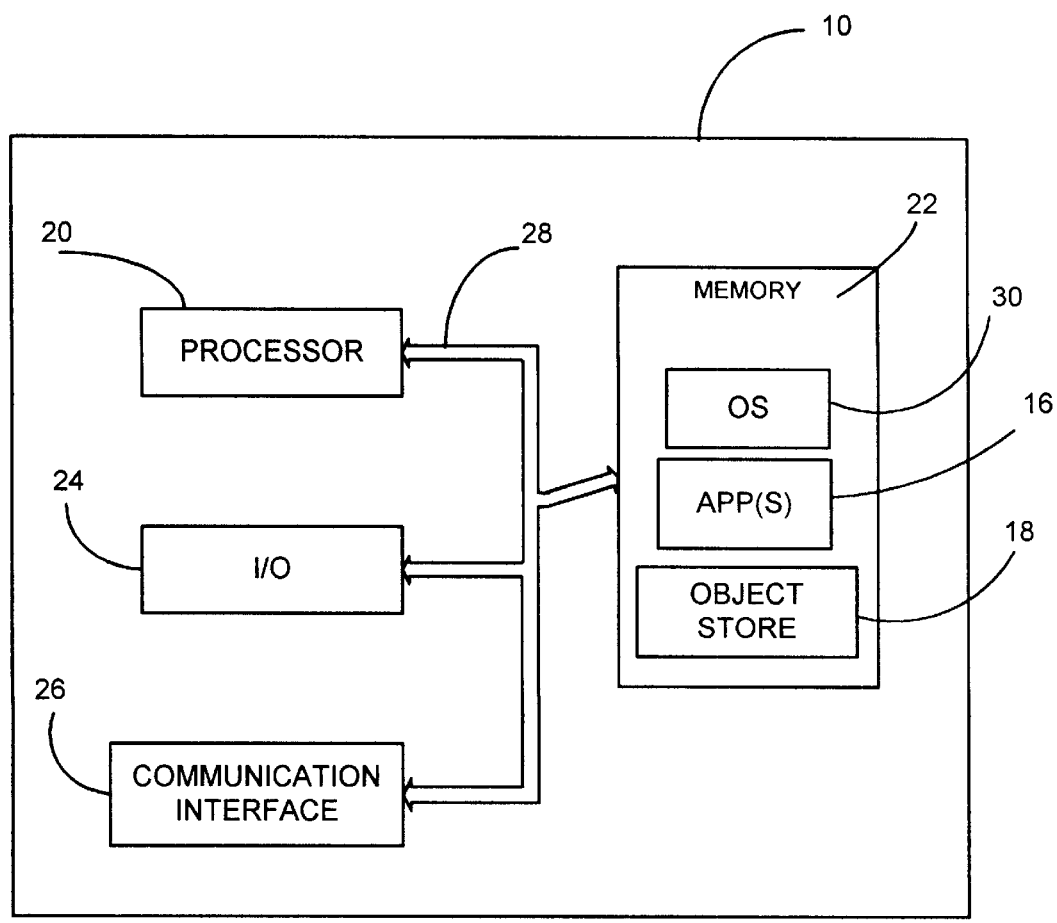
FIG. 2 is a more detailed block diagram of one embodiment of the mobile device shown in FIG. 1.

FIG. 2 is a more detailed block diagram of mobile device 10. Mobile device 10 preferably includes microprocessor 20, memory 22, input/output (I/O) components 24, and communication interface 26. In a preferred embodiment, these components of mobile 10 are coupled for communication with one another over a suitable bus 28.

Memory 22 is preferably implemented as non-volatile electronic memory such as random access memory (RAM) with read only memory (ROM) components with a battery back-up module (not shown) such that information stored in memory 22 is not lost when the general power to mobile device 10 is shut down. A portion of memory 22 is preferably allocated as addressable memory for program execution, while another portion of memory 22 is preferably used for storage, such as to simulate storage on a disc drive.

Memory 22 includes operating system 30, an application program 16 (such as PIM 16 discussed with respect to FIG. 1), as well as object store 18. During operation, operating system 30 is preferably executed by processor 20 from memory 22. Operating system 30, in one preferred embodiment, is a Windows CE brand operating system commercially available from Microsoft Corporation and is stored in ROM. The operating system 30 is preferably designed for mobile devices, and implements database features which can be utilized by PIM 16 (which is also preferably stored in ROM) through a set of exposed application programming interfaces and methods. The objects in object store 18 are preferably maintained by PIM 16 and operating system 30, at least partially in response to calls to the exposed application program interfaces and methods. Operating system 30 and PIM applications 16 use program storage memory to run and storage memory to store user data.

I/O components 24, in one preferred embodiment, are provided to facilitate input and output operations from a user of mobile device 10. I/O components 24 are described in greater detail with respect to FIGS. 3 and 4.

Communication interface 26 is optionally provided as any suitable, and commercially available, communication interface. Interface 26 is preferably used to communicate with desktop computer 12 or another mobile device 14, as described with respect to FIG. 1.

Figure 3:
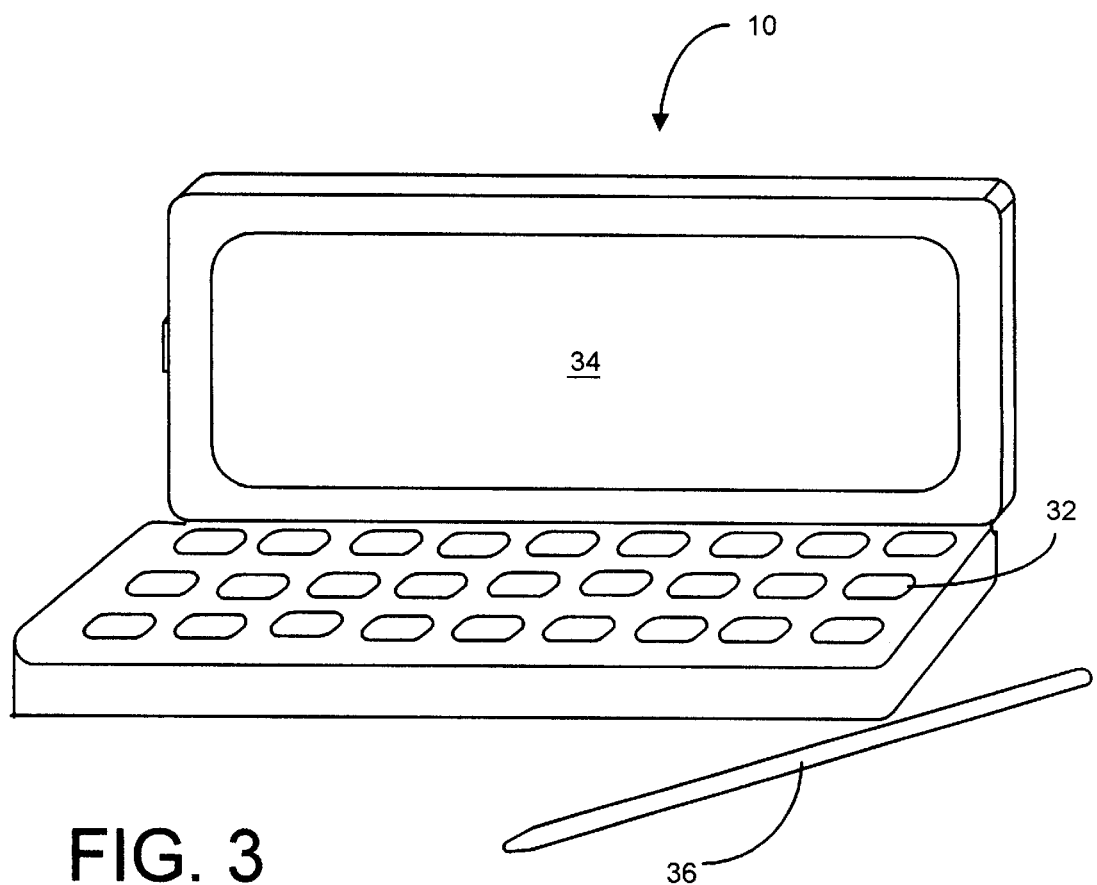
FIG. 3 is a simplified pictorial illustration of one embodiment of a mobile device in accordance with the present invention.

FIG. 3 is a simplified pictorial illustration of one preferred embodiment of a mobile device 10 which can be used in accordance with the present invention. Mobile device 10, as illustrated in FIG. 3, can be a desktop assistant sold under the designation H/PC having software provided by the Microsoft Corporation. In one preferred embodiment, mobile device 10 includes a miniaturized keyboard 32, display 34 and stylus 36. In the embodiment shown in FIG. 3, display 34 is a liquid crystal display (LCD) which uses a contact sensitive display screen in conjunction with stylus 36. Stylus 36 is used to press or contact the display 34 at designated coordinates to accomplish certain user input functions. Miniaturized keyboard 32 is preferably implemented as a miniaturized alpha-numeric keyboard, with any suitable and desired function keys which are also provided for accomplishing certain user input functions.

Figure 4:
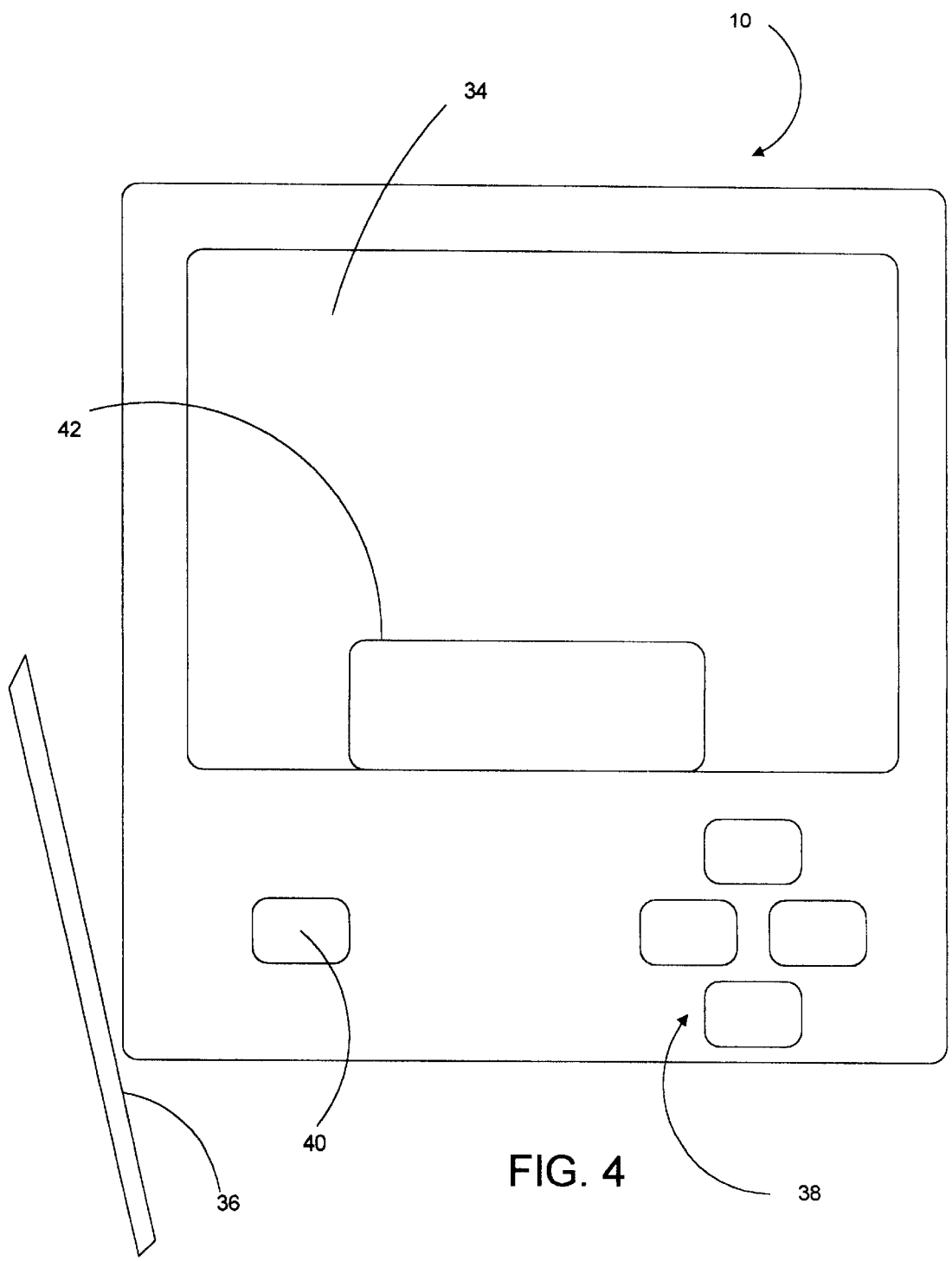
FIG. 4 is a simplified pictorial illustration of another embodiment of a mobile device in accordance with the present invention.

FIG. 4 is another simplified pictorial illustration of a mobile device 10 in accordance with another preferred embodiment of the present invention. Mobile device 10, as illustrated in FIG. 4, includes some items which are similar to those described with respect to FIG. 3, and are similarly numbered. For instance, mobile device 10, as shown in FIG. 4, also includes a touch sensitive display screen 34 which can be used, in conjunction with stylus 36, to accomplish certain user input functions. It should be noted that the display screen 34 for the mobile devices shown in FIGS. 3 and 4 can be the same size, or different size, but will typically be much smaller than a conventional display screen used with desktop computer 12 which is defined by a matrix of 640×480 coordinates. For example, the display screens 34 shown in FIGS. 3 and 4 may be defined by a matrix of only 640×240 coordinates, 240×320 coordinates, or 160×160 coordinates, or any other suitable size. Also, the present invention can be implemented on devices, with larger displays as well, such as a display screen for conventional desktop computer.

Mobile device 10 shown in FIG. 4 also includes a number of user input keys or buttons 38 (such as scroll buttons 38) which allow the user to perform a number of desired functions, such as to move through applications or scroll through menu options or other display options which are displayed on display screen 34, without contacting display screen 34. Of course, other user input buttons or mechanisms can be provided as well. In addition, mobile device 10 shown in FIG. 4 also preferably includes a power button 40 which can be used to turn on and off the general power to mobile device 10.

It should also be noted that, in the preferred embodiment, mobile device 10 shown in FIG. 4 includes a hand writing area 42. Hand writing area 42 can be used in conjunction with stylus 36 such that the user can write messages which are stored in memory 22 for later use by mobile device 10. In one preferred embodiment, the hand written messages are simply stored in hand written form and can be recalled by the user and displayed on screen 34 such that the user can review the hand written messages entered into mobile device 10. In another preferred embodiment, mobile device 10 is provided with a character recognition module such that the user can enter alpha-numeric information into mobile device 10 by writing that alpha-numeric information on area 42 with stylus 36. In that instance, the character recognition module in mobile device 10 recognizes the alpha-numeric characters and converts then into computer recognizable alpha-numeric characters which can be used by the application programs in mobile device 10.

It is also worth noting that, in the preferred embodiment, area 42 can be a discrete physical pad separate from display screen 34 on mobile device 10. Alternatively, area 42 can be either a predesignated portion of display screen 34, or it can be an area having a movable location on display screen 34. In the latter case, the location of area 42 can preferably be selectively relocated on screen 34 by the user, or by the application programs in mobile device 10. The applications preferably relocate area 42 on display screen 34 such that it resides in a convenient location on display screen 34, depending on the particular display then being displayed on mobile device 10.

In a further preferred embodiment, mobile device 10 can be configured to provide a soft keyboard on display screen 34. In that instance, during certain applications, an alpha-numeric keyboard is displayed on display screen 34. The user can then "type" in alpha-numeric messages, or actuate function keys on the soft keyboard, by contacting the desired keys on the soft keyboard with stylus 36.

In one preferred embodiment, the input panel area allows the keyboard and character recognition as default input methods, but any suitable input methods can be provided in accordance with the present invention. It should be noted that the present invention is not to be limited by the input method.

Figure 5:
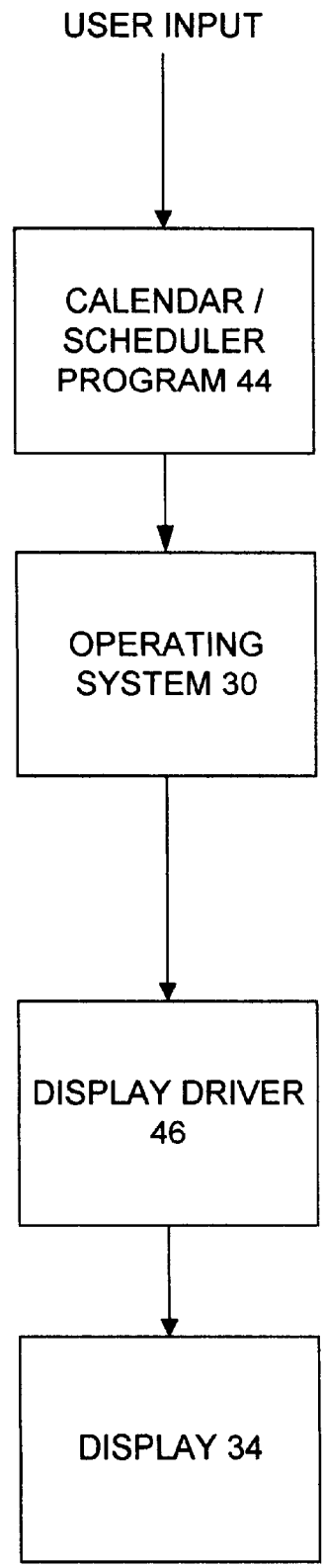
FIG. 5 is a functional block diagram illustrating how a mobile device in accordance with one aspect of the present invention displays calendar or scheduling events.

As discussed above, PIM 16 may preferably include a calendaring or scheduling program which allows the user to enter events, such as meetings, appointments, alarms, or any other events which the user wishes to schedule or enter in an appointment log or calendar maintained by PIM 16. FIG. 5 is a simplified block diagram which illustrates the process by which a user enters such event information. For example, a calendar or scheduling program can be requested by the user by entering a suitable user input function on mobile device 10. The calendar or scheduling program then provides, on display 34, a dialog or other user input display which allows the user to enter the desired event information using any of the techniques described above, or any other suitable user input techniques. This information is received on mobile device 10 by the calendar or scheduling program as indicated by block 44 in FIG. 5. The calendaring or scheduling program then stores that information on object store 18 for later use by the user. If the user then wishes to review calendared or scheduled events for a certain time period, the user actuates another suitable user input mechanism on mobile device 10, and either the calendaring and scheduling program, or the operating system, retrieves the necessary information from object store 18. If the calendaring and scheduling program retrieves the information, it provides the information to the operating system 30. Operating system 30 provides it to the display driver 46 in mobile device 10. The display driver 46 then provides the information to display screen 34 where it can be viewed and manipulated by the user. The particular order in which the information is provided and displayed is described in greater detail below.

In viewing such information, the user may desire to not only view appointments or scheduled events for a single day, but for many days into the future or into the past, such as a full week, or a month. Given the small size of the display screens 34 on mobile devices 10, displaying such voluminous information in any meaningful way to the user can present significant hurdles. For example, the resolution of display screen 34 may be so low as to make it very difficult to display to the user calendared or scheduled events for an entire month in a manner which allows the user to readily determine the time and duration of events which are scheduled on various days of that month.

Figure 6:
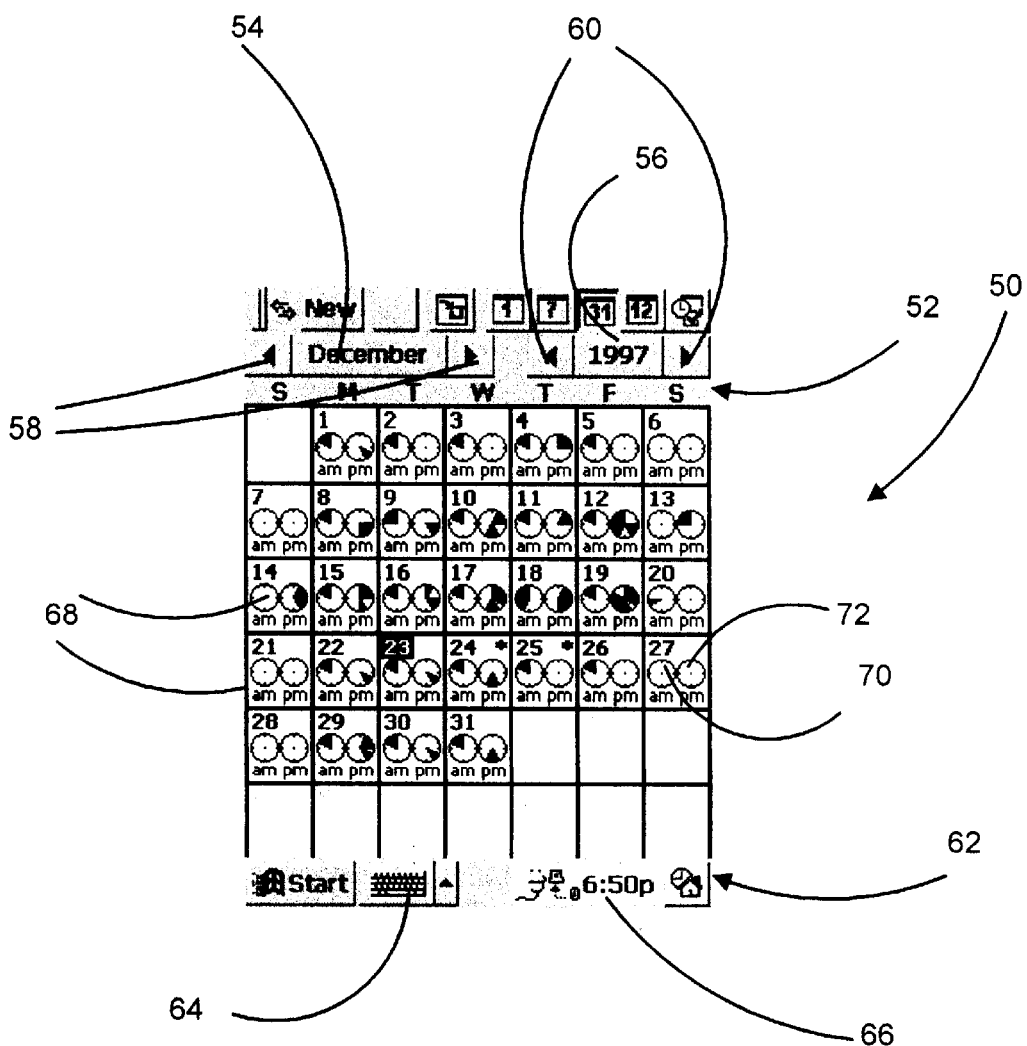
FIG. 6 is a calendar month view of scheduled events in accordance with one preferred embodiment of the present invention.

FIG. 6 illustrates one embodiment of a display 50 provided by mobile device 10 in accordance with one preferred embodiment of the present invention. Display 50 illustrates the time and duration of scheduled or calendared events for a full month. In the preferred embodiment shown in FIG. 6, display 50 includes an upper bar portion 52 which includes a month identifying portion 54 and a year identifying portion 56, as well as month scroll buttons 58 and year scroll buttons 60. Display 50 also preferably includes a lower display portion 62 which includes soft keyboard selection portion 64, and time display 66. The input method selection portion 64 and time display area 66 do not form part of the present invention and are included only for the sake of general illustration. Further, display 50 preferably includes a plurality of day boxes 68, one day box being provided for each day in the month being viewed.

Each day box 68 preferably has a plurality of items. For example, each day box 68 preferably has a numerical indicator which is indicative of the day of the month associated with that particular day box 68. The numerical indicator in display 50 is shown in the upper left hand corner of each day box 68, it is contemplated that the numerical indicator can be located in any portion of the day box 68 which is suitable. The numerical indicator is also preferably highlighted to indicate the present day or a selected day which is selected by a user for more detailed viewing. However, any part of the day box 68 (e.g., day number or entire box) might also be used to show the current day or selection. For example, the whole day box 68 might be shown using the inverse contrast of the other days, that is, what is black would be white and vice versa.

Each day box 68 also preferably includes a full day event indicator, such as an asterisk in the upper right hand corner of the day. The event indicator could be located anywhere in the day box. The full day event indicator (the asterisk in display 50) can be used to signify that the user wishes to be reminded that an event or item occurs on that day (perhaps throughout the entire day) but the event is not one which the user desires to appear as an item which is scheduled for the entire day. In other words, in display 50 shown in FIG. 6, an asterisk appears in the upper right hand corner of the day box corresponding to December 25$^{th}$. The user may wish to have the indicator turned on for that day indicating that it is a holiday, a vacation day, or to represent any other special event associated with that day. However, the user may not wish to block off the entire schedule for that day due to that event.

In the preferred embodiment shown in FIG. 6, each day box 68 also includes a plurality of clock face representations that reflect the entire 24 hour period corresponding to that particular day box. In the embodiment illustrated by display 50, each day box 68 includes an AM clock face representation 70 and a PM clock face representation 72. The AM clock face representation 70 corresponds to the 12 hours of the day between 12:00 Midnight and 12:00 Noon, while the PM clock face representation 72 corresponds to the 12 hour period from 12:00 Noon to 12:00 Midnight.

In accordance with one aspect of the present invention, the user can input an event to be scheduled into mobile device 10, along with the duration of that event. Of course, the user also enters the date on which the event is to occur. When the month containing that event is next viewed by the user, such as in display 50, indicia are provided on either the AM clock face representation 70 or the PM clock face representation 72 in the day box 68 corresponding to the day on which the event was scheduled. The indicia provide the user with a representation of the time at which the event is to occur, and the duration of that event.

In the preferred embodiment illustrated by display 50, the indicia include a shaded clock segment (or wedge) on the appropriate clock face representation 70 or 72 corresponding to the time at which the event has been scheduled. For example, display 50 shows that on December 23$^{rd}$, the user has entered appointments, meetings, or other events to occur between 10:00 AM and 12:00 PM, and between 4:00 and 5:00 PM. Similarly, on December 24$^{th}$, the user has entered events which occur between 10:00 AM and 12:00 PM and 5:00 and 7:00 PM. This provides the user with a very efficient way of viewing the user's schedule for a complete month and determining how busy the user is during each day of that month. In order to obtain more detailed information regarding the events scheduled any particular day, the user simply selects the desired day and, through any suitable user input functions, can select more detail regarding that particular day.

Figure 7:
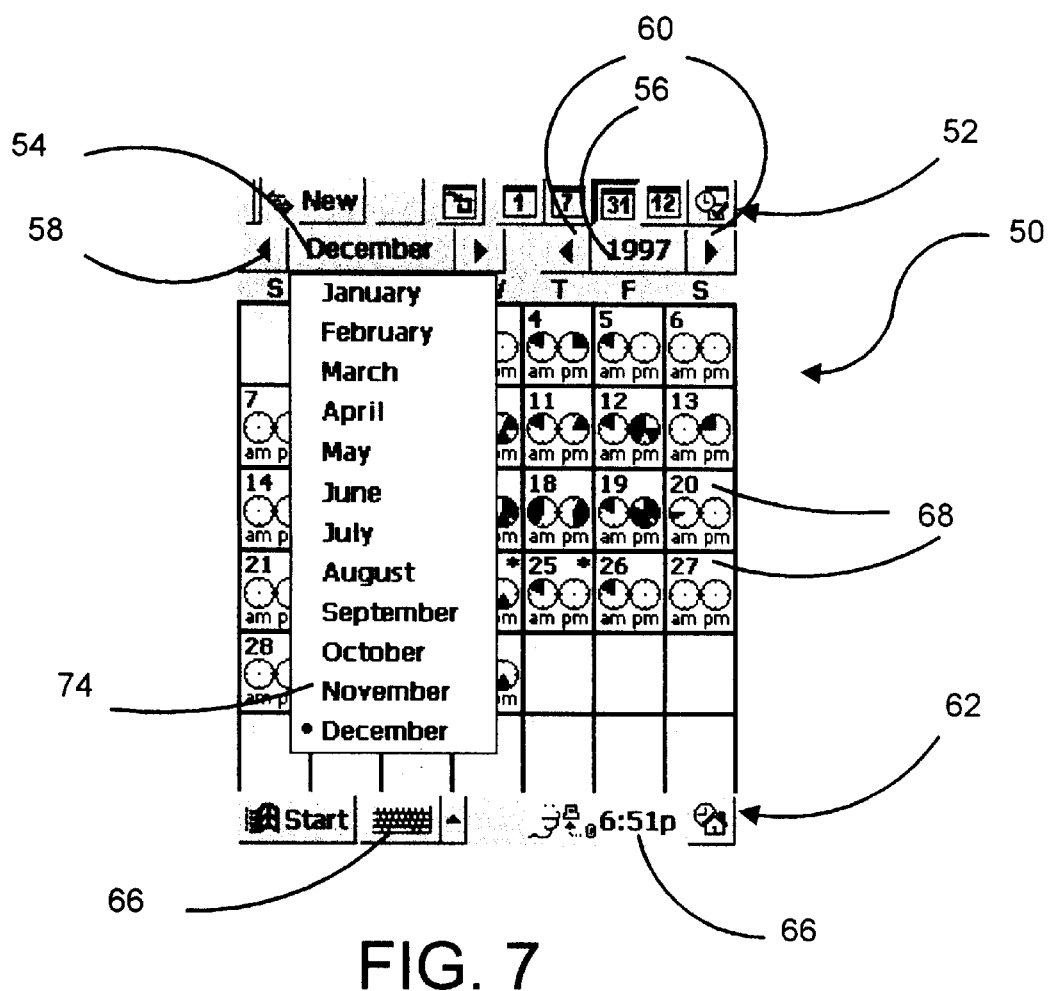
FIG. 7 illustrates the calendar month view of FIG. 6 and also a month selection box in accordance with another aspect of the present invention.
Figure 8:
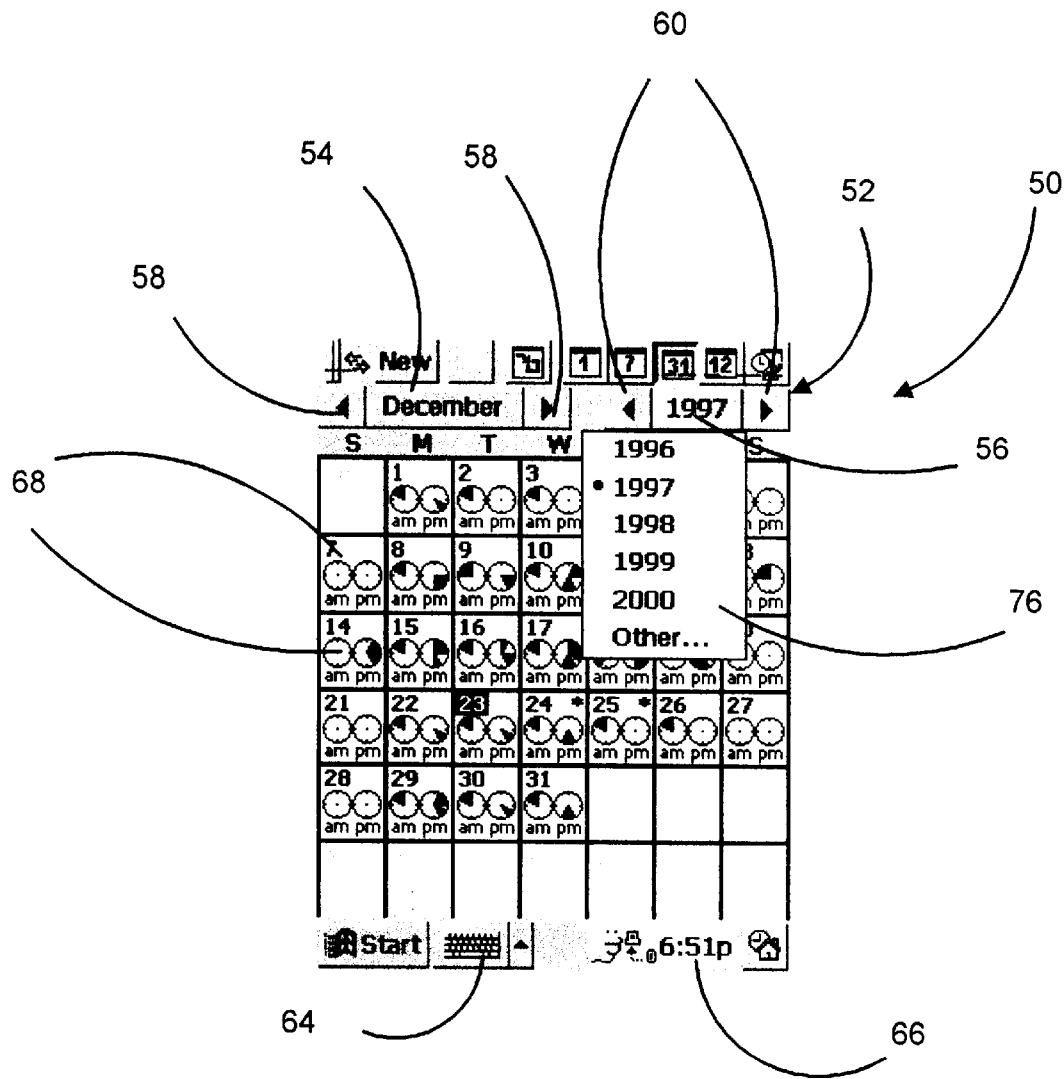
FIG. 8 illustrates the calendar month view of FIG. 6 and also a year selection box in accordance with another aspect of the present invention.
Figure 9:
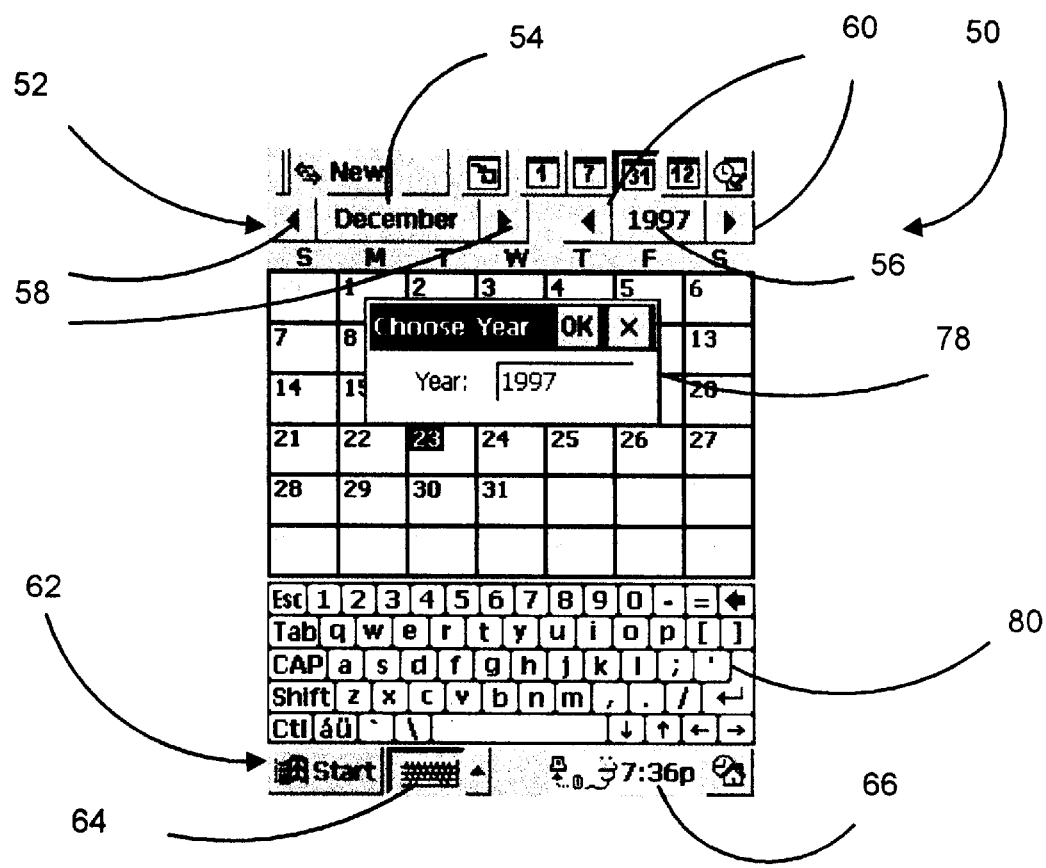
FIG. 9 illustrates a display in which a year is to be manually entered by the user of the mobile device in accordance with another aspect of the present invention.

The process for selecting different months and different years to be viewed is illustrated in FIGS. 7, 8 and 9. Similar items are similarly numbered to those shown in FIG. 6. When the user wishes to select a different month, the user simply actuates month scroll keys 58 on display 50 with stylus 36. This causes display 50 to cycle through past or future consecutive months in the direction indicated by the particular month scroll key 58 chosen.

Also, and as illustrated in FIG. 7, if the user simply touches month bar 54, month selection menu 74 is provided. In the preferred embodiment, month selection menu 74 provides a textual indication of each month in the year, and also an indication of which month is currently being viewed. To select another month, the user simply touches the desired month in selection menu 74, and display 50 is updated to display the calendar month view for the selected month.

Similarly, if the user wishes to select a different year, the user can simply touch one of the year scroll keys 60 to select previous or future consecutive years in the direction indicated by the arrow on year scroll keys 60. If the user does not wish to scroll to another year, the user can simply touch year bar 56 and a year selection menu 76 is displayed as shown in FIG. 8. Year selection menu 76 preferably includes a numerical representation of a suitable number of years, any of which can be selected by the user simply by touching the desired numerical representation. Menu 76 also preferably includes an indication of which year is currently being viewed.

If the year desired for viewing by the user does not appear on menu 76, the user can simply touch the "Other" entry in menu 76. In response, the display 50 is then updated to provide year selection box 78 as shown in FIG. 9. Display 50 also preferably provides soft keyboard 80. Year selection box 78 includes a year selection field in which the desired year can be entered by the user. In order to enter the desired year in the year selection field in box 78, the user simply enters the desired year by touching the appropriate alphanumeric keys on soft keyboard 80, and then touches the OK key in box 78. Of course, the user could use any suitable input method to enter this information. This information causes display 50 to be updated to display the chosen month in the new year entered in the year selection field in box 78 by the user.

Figure 10:
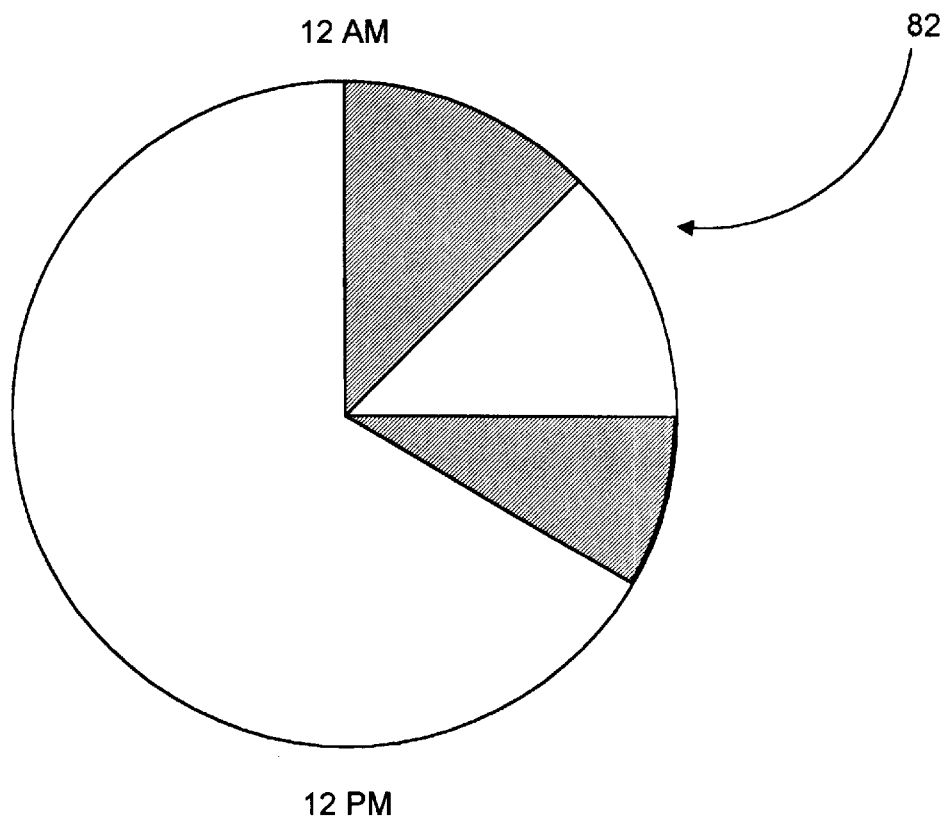
FIG. 10 illustrates a clock face representation in accordance with another preferred embodiment of the present invention.
Figures 11A, 11B:
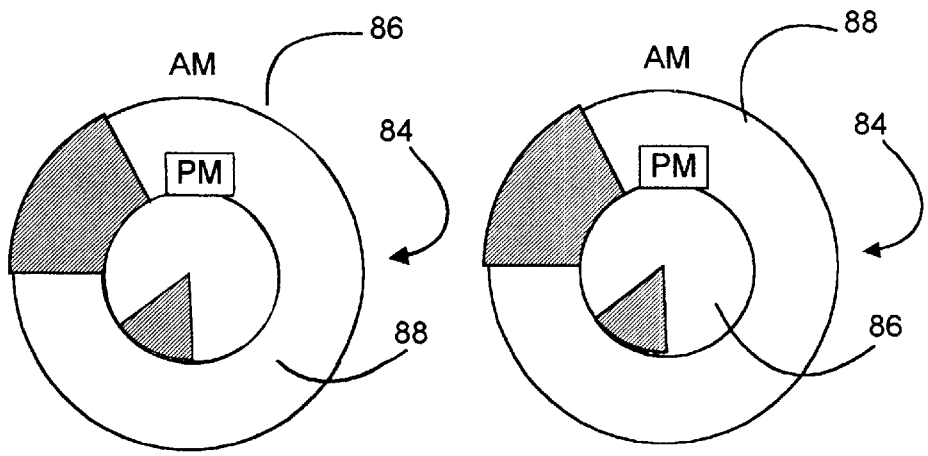
FIGS. 11A and 11B illustrate clock face representations in accordance with other preferred embodiments of the present invention.

Other embodiments of the clock face representations, other than those shown in FIGS. 6–8 can also be utilized in accordance with the present invention. FIGS. 10 and 11A–11B show three additional embodiments of such clock face representations.

FIG. 10 illustrates a 24 hour clock face representation which can be used as an alternative to AM and PM clock face representation 70 and 72 shown in FIGS. 6–8. In the embodiment shown in FIG. 10, a 24 hour clock face representation 82 is provided. 24 hour clock face representation 82 includes alphanumeric indicia representative of 12:00 AM (or 12:00 noon) at a top portion of clock face representation 82, and an alpha-numeric indicia representative of 12:00 PM (or 12:00 midnight) at a bottom portion of clock face representation 82. In the example illustrated in FIG. 10, the user has entered one or more events which begin at 12:00 Midnight and which continue until 3:00 AM. The user has also entered one or more events which begin at 6:00 AM and continue to 8:00 A.M. The user observable indicia which correspond to those events are shaded clock segments or wedges.

In the embodiment shown in FIG. 11A, a clock face implementation 84 is provided as two superimposed clock face representations. Clock face representation 84 includes an outer AM clock face representation 86 and an inner PM clock face representation 88. Outer clock face representation 86 is similar to AM clock face representation 70 shown in FIG. 6, and an inner clock face representation 88 is similar to PM clock face representation 72 shown in FIG. 6, except that PM clock face representation 88 is superimposed over AM clock face representation 86 in FIG. 11A. In the example illustrated in FIG. 11A, the user has scheduled one or more events which begin at 9:00, and extend to 11:00 AM, and one or more other events which begin at 6:00 PM and continue to 8:00 PM.

FIG. 11B illustrates an embodiment similar to that shown in FIG. 11A except that the AM clock face representation is superimposed over the PM clock face representation and different appointment times are illustrated (e.g., 6–8 AM and 9–11 PM). Other suitable clock face representations can be used as well. For example, any suitable shape for clock face representation can of course be used, such as square, star, rectangle, oval, or any other suitable shape.

In one illustrative embodiment, the scheduled or calendared events are not all displayed on the display 50 at the same time. Rather, the scheduled or calendared events are displayed in groups in a predetermined order. For example, in rendering display 50, the data indicative of recurring appointments can first be displayed. Then, the days in display 50 can be filled in with all other scheduled or calendared events. In yet another illustrative embodiment, recurring appointments are first displayed, then display 50 is filled in with non-recurring appointments or meetings, and finally display 50 is filled in with alarms. Of course, the particular order in which the scheduled or calendared events is displayed or is filled in on display 50, can vary and the order described above is simply one illustrative order.

In any case, by displaying the calendared or scheduled events in a time wise fashion according to a predetermined order, the user viewing the display is provided with an indication as to whether the display is complete. This is done without providing the user with a traditional type of user interface, such as a status bar, for indicating the status of the display. Rather, the data being displayed, itself, acts to provide the user with an indication as to whether the display is completely rendered.

Other variations can also be implemented. For example, each type of data can be displayed in a different color. Thus, as the user views the display, as the display is being generated, recurring appointments would first be filled in using a first color, non-recurring appointments and meetings would then be filled in using a second color, and alarms would be filled in using a third color. Further, while the displayed is being filled in, each of the events could be displayed in a different form, such as in a crosshatched or lightly shaded form. Then, when the display is complete, the events would be displayed in a solid color. This would give the user a further indication that rendering of the display was complete.

In addition, the present invention can also implement a pause between displaying different types of information. For example, the recurring appointments information could first be filled in on the display. Then, after a short pause, the non-recurring appointments are filled in, etc. Of course, the present invention can also be implemented by simply displaying the different types of information, in order, as fast as they can be displayed.

In addition, some PIMs allow different types of events to be scheduled according to different criteria. For example, one may be able to schedule an event "tentatively", indicate that an individual is "out of the office", "busy", "free", etc . . . The present invention can be utilized to indicate these types of events using different types of shading on the clock face representations, color variances, or other suitable visual indicia. Also, as described above, such items can be displayed according to a predetermined order.

It should be noted that in one embodiment of the present invention, the indicia (such as the shaded wedges) which indicate the time and duration of scheduled events are expanded to the nearest hour which encompasses the actual time of the event. In other words, if a user schedules an event to begin at 10:10 AM and continue to 11:20 AM, the indicia will appear as if the user had scheduled the meeting to begin at 10:00 AM and continue to 12:00 Noon. However, the indicia can be rounded to any other desired increment, such as every half hour, every fifteen minutes, or any other suitable increment, based on the preference of the user or the developer, and based on the size and resolution of the particular display screen 34 being used.

It should also be noted that the present invention can be utilized on devices, other than the mobile devices discussed herein. For example, the present invention can be utilized on displays for desktop computers, computers used in automobiles or telephones or other devices as well. The present invention is simply well suited to mobile devices or other devices where the size of the display screens or the portions of the display screens allocated to displaying events are relatively small, and the resolution of the display screens or portions thereof are relatively low.

Further, while the present invention has been described illustrating shaded areas on the clock face representations, other visual indicia can be provided as well. For example, in order to indicate an alarm or timer event, a single line on the clock face, at the appropriate time, could be used. Also, rather than simply shading clock segments in gray, multicolor contrast, or other visually contrasting techniques or other suitable visual indicia can be used as well.

Thus, it can be seen that the analog clock face representations discussed herein provide a highly efficient mechanism for communicating scheduled event information to a user. Clock face representations can be displayed on small screens, with low resolution, and still communicate very effectively with the user.

Although the present invention has been described with reference to preferred embodiments, workers skilled in the art will recognize that changes may be made in form and detail without departing from the spirit and scope of the invention.

What is claimed is:

1. A method of displaying indicia representative of a schedule of events on a display screen in a computing device, the method comprising:

obtaining event information indicative of a starting time of an event and a duration of the event;

providing a calendar display comprising:

a month view representative of a calendar month with a plurality of days, each day including a corresponding clock face representation of a desired time period, the clock face representation including a user observable portion comprising a visually contrasting clock segment indicative of the starting time and the duration of the event.

2. The method of claim 1 wherein providing the calendar display comprises:

providing the clock face representation as a plurality of clock face representations, each of the plurality of clock face representations corresponding to a different time period of the day to which the clock face representations correspond.

3. The method of claim 2 wherein providing the calendar display comprises:

providing the plurality of clock face representations with a visual indication of the time period to which each of the plurality of clock face representations corresponds.

4. The method of claim 3 wherein providing the calendar display comprises:

providing a first of the plurality of clock face representations corresponding to an am time period and a second of the plurality of clock face representations corresponding to a pm time period.

5. The method of claim 4 wherein providing the calendar display comprises:

providing the first of the plurality of clock face representations with a textual am indicator indicating that the first clock face representation corresponds to an am time period; and providing the second of the plurality of clock face representations with a textual pm indicator indicating that the second clock face representation corresponds to a pm time period.

6. The method of claim 5 wherein providing the calendar display comprises:

providing the first and second clock face representations as separate visual representations.

7. The method of claim 5 wherein providing the calendar display comprises:

providing one of the first and second clock face representations superimposed over another of the first and second clock face representations.

8. The method of claim 1 wherein providing the calendar display comprises:

providing the clock face representation as a single clock face representative of a twenty four hour time period.

9. The method of claim 1 wherein providing the calendar display comprises:

providing the month view with a plurality of days, each day including a numerical indicator indicative of a day of a month being viewed.

10. The method of claim 9 wherein providing the calendar display comprises:

providing the month view with a plurality of days, each day including a user selectable indicator indicative of an event not reflected on the clock face representation.

11. The method of claim 1 wherein providing the calendar display comprises:

providing the user observable portion to indicate a start time and duration only in a desired time increment.

12. A method of displaying indicia representative of a schedule of events on a display screen of a computing device, the method comprising:

obtaining event information indicative of a starting time of an event and a duration of the event;

providing a calendar display based on the event information, the calendar display comprising:

a view representative of a plurality of days, each day including a corresponding clock face representation of a desired time period, the clock face representation including a visually contrasting clock segment portion indicative of the starting time and the duration of the event.

13. The method of claim 12 wherein providing the calendar display comprises:

providing the visually contrasting clock segment portion in a desired minimum time segment.

14. The method of claim 12 wherein providing the calendar display comprises:

providing the clock face representation as a plurality of clock face representations, each of the plurality of clock face representations corresponding to a different time period of the day to which the clock face representations correspond.

15. The method of claim 14 wherein providing the calendar display comprises:

providing the plurality of clock face representations with a visual indication of the time period to which each of the plurality of clock face representations corresponds.

16. The method of claim 15 wherein providing the calendar display comprises:

providing a first of the plurality of clock face representations corresponding to an am time period and a second of the plurality of clock face representations corresponding to a pm time period.

17. The method of claim 16 wherein providing the calendar display comprises:

providing the first of the plurality of clock face representations with a textual am indicator indicating that the first clock face representation corresponds to an am time period; and providing the second of the plurality of clock face representations with a textual pm indicator indicating that the second clock face representation corresponds to a pm time period.

18. The method of claim 17 wherein providing the calendar display comprises:

providing the first and second clock face representations as separate visual representations.

19. The method of claim 17 wherein providing the calendar display comprises:

providing one of the first and second clock face representations superimposed over another of the first and second clock face representations.

20. The method of claim 12 wherein providing the calendar display comprises:

providing the clock face representation as a single clock face representative of a twenty four hour time period.

21. The method of claim 12 wherein providing the calendar display comprises:

providing a month view with a plurality of days indicative of the days in an entire month being viewed.

22. The method of claim 12 wherein providing the calendar display comprises:

providing the month view with a plurality of days, each day including a user selectable indicator indicative of an event not reflected on the clock face representation.

23. A computer readable medium having computer readable instructions stored thereon for causing a computing device to display indicia of events on a display screen of the computing device, the computer readable instructions causing the computing device to perform the steps of:

providing an event display including a calendar display having a month view with a plurality of days and a visual indication of a day on which an event occurs and an analog clock face representation having user observable visually contrasting clock segment indicia thereon indicative of a time at which the event occurs.

24. The computer readable medium of claim 23 wherein the computer readable instructions further cause the computing device to perform the steps of:

receiving event input information indicative of a starting time of the event and a duration of the event; and storing the event input information.

25. The computer readable medium of claim 23 wherein the computer readable medium is configured for use with a mobile device.

26. The computer readable medium of claim 25 wherein providing an event display comprises:

providing the user observable visually contrasting clock segment indicia as a visually contrasting clock segment located on the clock face representation to indicate the time at which the event occurs and a duration of the event.

27. The computer readable medium of claim 26 wherein providing the event display comprises:

providing the clock face representation as a plurality of clock face representations, each of the plurality of clock face representations corresponding to a different time period of the day to which the clock face representations correspond.

28. The computer readable medium of claim 27 wherein providing the event display comprises:

providing the plurality of clock face representations with a visual indication of the time period to which each of the plurality of clock face representations corresponds.

29. The computer readable medium of claim 28 wherein providing the event display comprises:

providing one of the first and second clock face representations superimposed over another of the first and second clock face representations.

30. The computer readable medium of claim 26 wherein providing the event display comprises:

providing the clock face representation as a single clock face representative of a twenty four hour time period.

31. The computer readable medium of claim 23 wherein providing the event display comprises:

providing a month view with a plurality of days indicative of the days in an entire month being viewed, each day including an analog clock face representation having user observable indicia thereon indicative of a time at which an event occurs on that day and a duration of the event.

32. A method of displaying indicia representative of a schedule of events on a display screen in a computing device, the method comprising:

obtaining event information indicative of a plurality of different types of events and indicative of a starting time of each event and a duration of each event;

providing a calendar display comprising:

a month view representative of a calendar month with a plurality of days, each day including a corresponding clock face representation of a desired time period, the clock face representation including a user observable portion comprising a visually contrasting clock segment indicative of the starting time and the duration of each event the user observable portion being filled in to indicate each of the different types of events in a predetermined order.

33. The method of claim 32 wherein providing the calendar display comprises:

providing the clock face representation as a plurality of clock face representations, each of the plurality of clock face representations corresponding to a different time period of the day to which the clock face representations correspond.

34. The method of claim 33 wherein providing the calendar display comprises:

providing the plurality of clock face representations with a visual indication of the time period to which each of the plurality of clock face representations corresponds.

35. The method of claim 34 wherein providing the calendar display comprises:

providing a first of the plurality of clock face representations corresponding to an AM time period and a second of the plurality of clock face representations corresponding to a PM time period.

36. The method of claim 35 wherein providing the calendar display comprises:

providing the first and second clock face representations as separate visual representations.

37. The method of claim 35 wherein providing the calendar display comprises:

providing one of the first and second clock face representations superimposed over another of the first and second clock face representations.

38. The method of claim 32 wherein providing the calendar display comprises:

providing the clock face representation as a single clock face representative of a twenty four hour time period.

* * * * *

UNITED STATES PATENT AND TRADEMARK OFFICE
CERTIFICATE OF CORRECTION

PATENT NO. : 6,266,295 B1  
DATED : July 24, 2001  
INVENTOR(S) : Parker et al.

It is certified that error appears in the above-identified patent and that said Letters Patent is hereby corrected as shown below:

<u>Title page,</u>
Item [75], Inventors, "Greg Keyser" should be -- Greg A. Keyser --.

<u>Column 5,</u>
Line 27, "then" should be -- them --.

<u>Column 8,</u>
Line 37, "noon" should be -- midnight --.
Line 39, "midnight" should be -- noon --.

Signed and Sealed this

Thirteenth Day of August, 2002

*Attest:*

*Attesting Officer*

JAMES E. ROGAN
*Director of the United States Patent and Trademark Office*